(12) United States Patent
Miura

(10) Patent No.: US 7,325,393 B2
(45) Date of Patent: Feb. 5, 2008

(54) DETERIORATION DIAGNOSING DEVICE AND DIAGNOSING METHOD FOR EXHAUST GAS PURIFICATION CATALYST

(75) Inventor: Manabu Miura, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 85 days.

(21) Appl. No.: 11/059,480

(22) Filed: Feb. 17, 2005

(65) Prior Publication Data

US 2005/0188679 A1   Sep. 1, 2005

(30) Foreign Application Priority Data

Feb. 27, 2004   (JP)   ............... 2004-053376

(51) Int. Cl.
*F01N 3/00*   (2006.01)
(52) U.S. Cl. .................. 60/277; 60/282; 60/299
(58) Field of Classification Search .............. 60/277
See application file for complete search history.

(56) References Cited

U.S. PATENT DOCUMENTS

| | | | | |
|---|---|---|---|---|
| 4,007,589 A | * | 2/1977 | Neidhard et al. | 60/276 |
| 5,097,700 A | * | 3/1992 | Nakane | 73/118.1 |
| RE33,942 E | * | 6/1992 | Katsuno et al. | 60/274 |
| 5,275,712 A | * | 1/1994 | Hetrick et al. | 204/425 |
| 5,279,115 A | * | 1/1994 | Inoue et al. | 60/276 |
| 5,400,592 A | * | 3/1995 | Mukaihira et al. | 60/274 |
| 5,640,847 A | * | 6/1997 | Nakajima et al. | 60/276 |
| 5,693,877 A | * | 12/1997 | Ohsuga et al. | 73/118.1 |
| 5,743,086 A | * | 4/1998 | Nagai | 60/276 |
| 5,979,161 A | * | 11/1999 | Hanafusa et al. | 60/277 |
| 6,216,450 B1 | * | 4/2001 | Takahashi et al. | 60/276 |
| 6,494,037 B2 | * | 12/2002 | Oguma et al. | 60/285 |
| 6,922,985 B2 | * | 8/2005 | Wang et al. | 60/277 |

FOREIGN PATENT DOCUMENTS

JP   7-103039 A   4/1995

\* cited by examiner

*Primary Examiner*—Thomas Denion
*Assistant Examiner*—Loren Edwards
(74) *Attorney, Agent, or Firm*—Foley & Lardner LLP

(57) ABSTRACT

To determine whether an exhaust gas purification catalyst (42) of an engine (1) has deteriorated, a characteristic of exhaust gas on an upstream side of the catalyst (42) is detected, a characteristic of the exhaust gas on a downstream side of the catalyst (42) is detected, and when the engine (1) operates at a lean air-fuel ratio, a value expressing a difference in the oxygen concentration on the upstream side and downstream side of the catalyst (42) (an average excess air ratio difference) is calculated from the two detected values. When the value expressing the difference in the oxygen concentration is smaller than a deterioration determination threshold calculated in accordance with a quantity of state of the catalyst (42), the catalyst (42) is determined to have deteriorated.

9 Claims, 9 Drawing Sheets

DETERIORATION DIAGNOSING DEVICE AND DIAGNOSING METHOD FOR EXHAUST GAS PURIFICATION CATALYST

TECHNICAL FIELD OF THE INVENTION

This invention relates to the diagnosis of deterioration of an exhaust gas purification catalyst for an engine.

BACKGROUND OF THE INVENTION

A catalyst for purifying engine exhaust gas is provided in the exhaust passage of diesel engines and gasoline engines. JP7-103039A, published by the Japan Patent Office in 1995, discloses a technique for diagnosing whether or not the catalyst has deteriorated.

SUMMARY OF THE INVENTION

The device disclosed in JP7-103039A is applied to a gasoline engine. In this device, oxygen sensors having an output which varies binarily about a stoichiometric air-fuel ratio are provided before and after a three-way catalyst provided in an exhaust passage, and deterioration of the three-way catalyst is determined on the basis of the output of these two oxygen sensors.

In this determination method, the air-fuel ratio must be returned to the vicinity of the stoichiometric air-fuel ratio to determine whether or not the catalyst has deteriorated. Therefore, when the device disclosed in JP7-103039A is applied to a diesel engine or lean burn gasoline engine which operates mainly at a lean air-fuel ratio, the air-fuel ratio must be returned from the lean air-fuel ratio to the stoichiometric air-fuel ratio every time diagnosis is performed, which leads to a deterioration in fuel economy. Deterioration of the fuel economy may be avoided by restricting operations at the stoichiometric air-fuel ratio, but in so doing, the number of opportunities for determining whether or not the catalyst has deteriorated is reduced.

It is therefore an object of this invention to prevent deterioration of the fuel economy while securing opportunities for diagnosis, and to ensure that the precision with which catalyst deterioration is diagnosed does not decrease.

In order to achieve above object, this invention provides a catalyst deterioration diagnosing device comprising: an exhaust gas purification catalyst provided in an exhaust passage of an engine; an upstream side sensor which detects a characteristic of an exhaust gas on an upstream side of the catalyst; a downstream side sensor which detects a characteristic of the exhaust gas on a downstream side of the catalyst; and a controller into which a detection signal of the sensors is input.

The controller functions to: calculate a value expressing a difference in an oxygen concentration on the upstream side and the downstream side of the catalyst from the two detected values when the engine operates at a lean air-fuel ratio; and determine that the catalyst has deteriorated when the value expressing the difference in the oxygen concentration is smaller than a deterioration determination threshold calculated in accordance with a quantity of state of the catalyst.

The details as well as other features and advantages of this invention are set forth in the remainder of the specification and are shown in the accompanying drawings.

DESCRIPTION OF THE PREFERRED EMBODIMENTS

Figure 1:
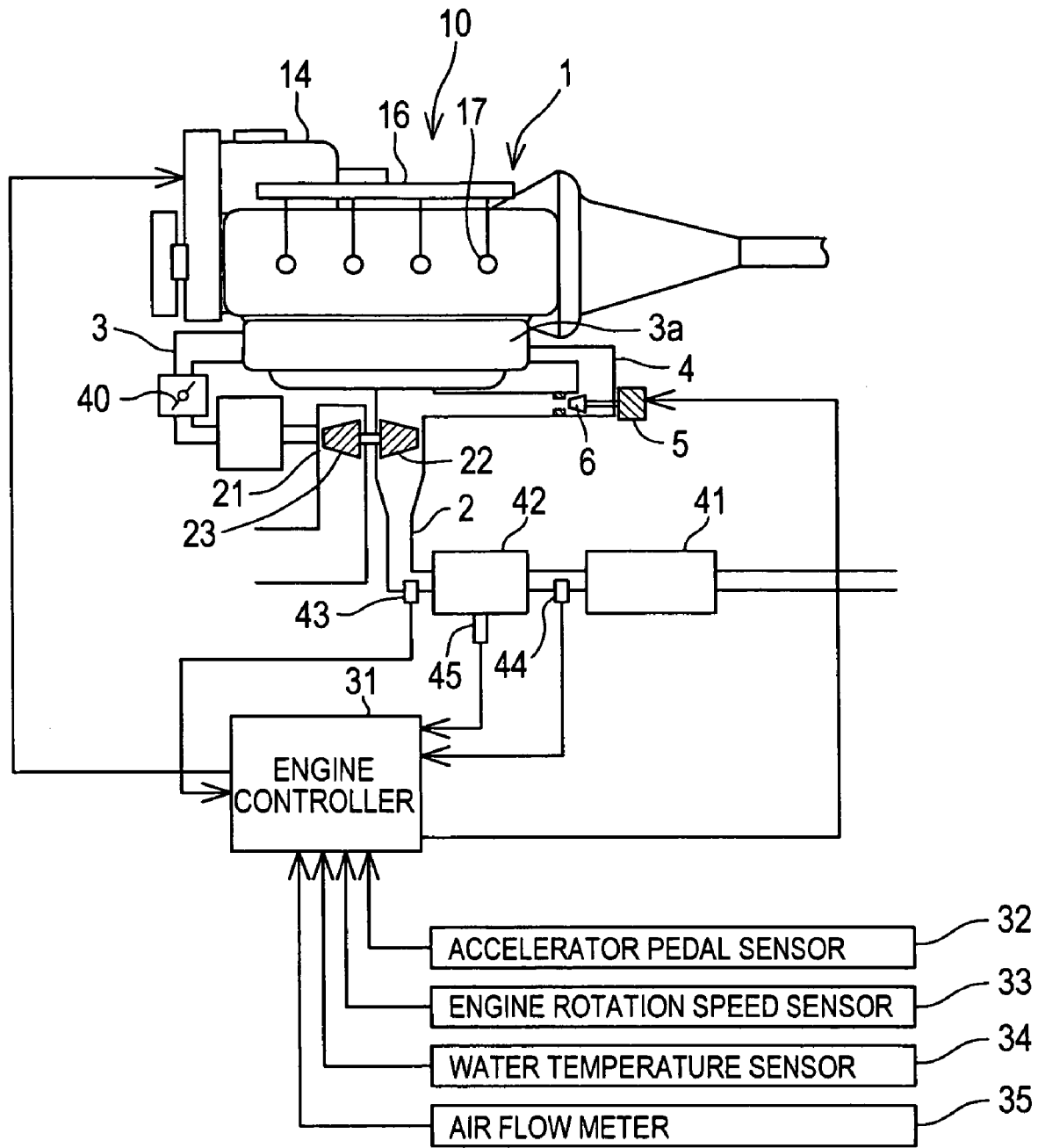
FIG. 1 is a schematic diagram of a diesel engine to which this invention is applied.

Referring to FIG. 1 of the drawings, a diesel engine 1 comprises an EGR passage 4 linking an exhaust passage 2 and a collector portion 3a of an intake passage 3. An EGR valve 6 driven by a step motor 5 is provided in the EGR passage 4. The step motor 5 is driven by a control signal from an engine controller 31, and thus a predetermined EGR rate corresponding to the operating condition is realized by regulating the amount of exhaust gas that is recirculated.

The engine 1 comprises a fuel injection device 10. The fuel injection device 10 mainly comprises a fuel tank (not shown), a supply pump 14, a common rail (accumulator) 16, and an injector 17 which is provided for each cylinder. Fuel that has been pressurized by the supply pump 14 is accumulated in the accumulator 16, whereupon the high-pressure fuel in the accumulator 16 is distributed among the injectors 17.

The injector 17 comprises a needle valve, a nozzle chamber, a fuel supply passage leading to the nozzle chamber, a retainer, a hydraulic piston, and a return spring. A three-way valve constituted by an electromagnetic valve is interposed in the fuel supply passage leading to the hydraulic piston. When the three-way valve is in an OFF state, the needle valve is in a sitting condition. When the three-way valve enters an ON state, the needle valve rises such that fuel is injected from an injection hole at the tip end of the injector. The fuel injection start timing is regulated by the timing at which the three-way valve is switched from OFF to ON, and the fuel injection amount is regulated by the length of the ON period. If the pressure in the accumulator 16 is constant, then the fuel injection amount increases as the ON period lengthens.

A variable capacity turbocharger 21, in which a turbine 22 that converts the thermal energy of exhaust gas into rotary energy and a compressor 23 that compresses intake air are connected coaxially, is provided on the exhaust passage 2 downstream of an opening portion of the EGR passage 4. A variable nozzle driven by an actuator is provided at a scroll inlet of the turbine 22, although not shown in the drawing. To obtain a predetermined boost pressure from a low rotation speed region, the variable nozzle is controlled by the engine controller 31 to a nozzle opening which increases the flow of exhaust gas into the turbine 22 (a tilting condition) on a low rotation speed side, and to a nozzle opening which allows exhaust gas to enter the turbine 22 without resistance (a fully open condition) on a high rotation speed side.

A throttle 40 driven by an actuator, not shown in the drawing, is provided at an inlet to the collector 3a.

In the engine controller 31, into which signals from an accelerator pedal sensor 32, a sensor 33 which detects an engine rotation speed and a crank angle, a water temperature sensor 34, and an air flow meter 35 are input, EGR control and boost pressure control are performed in a coordinated fashion to obtain a target EGR rate and a target boost pressure on the basis of these signals.

A filter 41 which traps particulate matter contained in the exhaust gas is disposed in the exhaust passage 2. When the trapped amount of particulate matter in the filter 41 reaches a predetermined value, the air-fuel ratio of the engine 1 is switched from a lean air-fuel ratio to the stoichiometric air-fuel ratio or a rich air-fuel ratio in order to raise the exhaust gas temperature so that the particulate matter trapped in the filter 41 is burned, and thus removed.

An HC trap catalyst 42 is provided on the upstream side of the filter 41. The HC trap catalyst 42 traps HC when the exhaust gas temperature is low, and when the exhaust gas rises to or above a predetermined temperature, the trapped HC is discharged through desorption and purified by oxidation using oxygen in the exhaust gas.

Wide range air-fuel ratio sensors 43, 44 which can detect the air-fuel ratio in a linear fashion are provided before and after the HC trap catalyst 42. The engine controller 31 performs a deterioration diagnosis on the catalyst 42 on the basis of the outputs of the upstream side sensor 43 and the downstream side sensor 44 of the catalyst 42.

The ability to diagnose deterioration of the catalyst 42 while operating at a lean air-fuel ratio, as described above, has come about on the basis of the following new knowledge regarding the catalyst 42.

Figure 2:
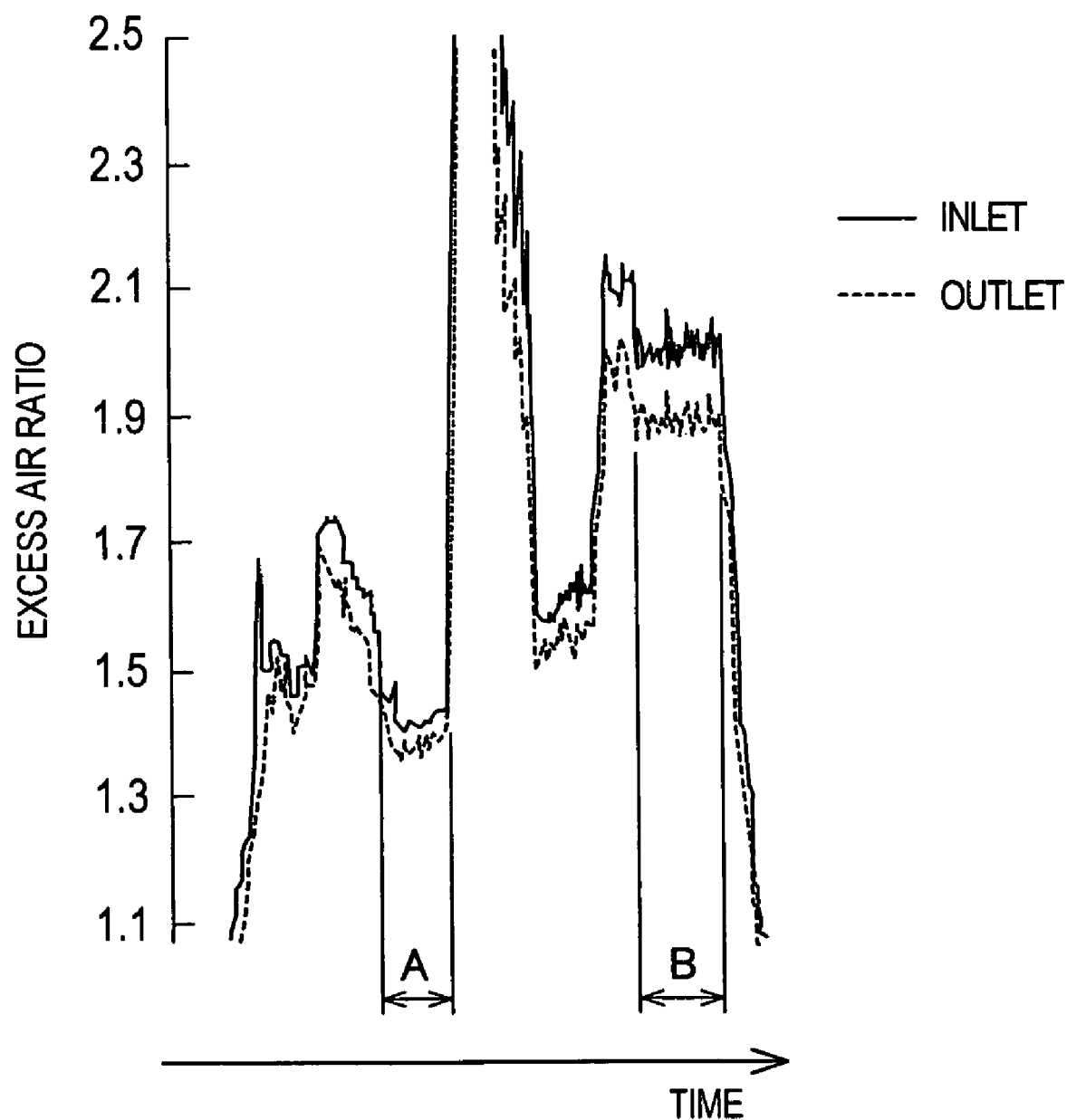
FIG. 2 is a wave form chart showing variation between an excess air ratio at a catalyst inlet and an excess air ratio at a catalyst outlet when the diesel engine is operative.

FIG. 2 shows actual variation in the excess air ratio at the inlet and outlet of the catalyst 42 when the engine 1 is operated according to a predetermined operating mode. The engine 1 operates with a target excess air ratio of approximately 1.4 in a section A, and a target excess air ratio of approximately 1.9 in a section B. The actual excess air ratio at the inlet to the catalyst 42 at this time varies from approximately 1.4 in the section A to approximately 1.9 in the section B (substantially equal to the target excess air ratio), whereas the actual excess air ratio at the outlet of the catalyst 42 shifts to a larger side (leaner side) than the excess air ratio at the catalyst inlet in both sections A and B. Moreover, the difference between the excess air ratio at the outlet of the catalyst 42 and the excess air ratio at the catalyst inlet is greater in the section B than the section A. The excess air ratio is supposed to be identical before and after the catalyst, and hence this difference in the excess air ratio before and after the catalyst is an anomalous phenomenon.

Figure 3:
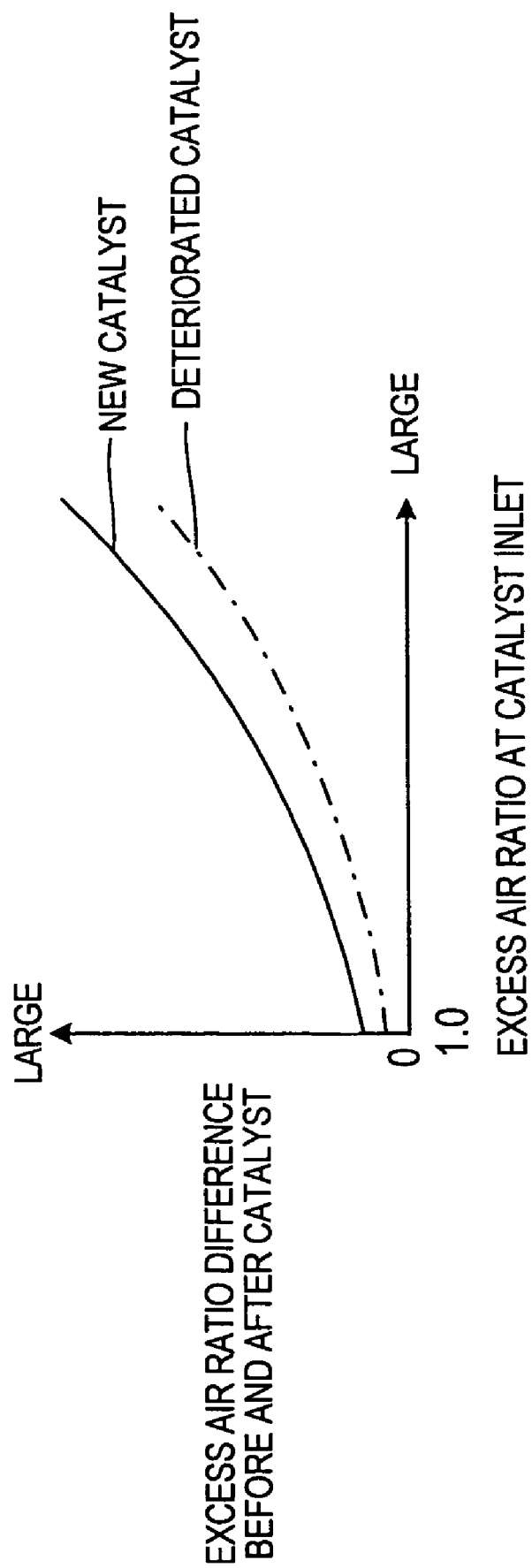
FIG. 3 is a characteristic diagram of an excess air ratio difference before and after the catalyst in a lean air-fuel ratio region.

As a result of further investigation, the experiment result shown in FIG. 3 was obtained. When the excess air ratio at the inlet to the catalyst 42 is plotted on the abscissa, and the difference between the excess air ratio at the inlet to the catalyst 42 and the excess air ratio at the outlet of the catalyst 42 (the excess air ratio difference before and after the catalyst) is plotted on the ordinate, it was learned that the excess air ratio difference before and after the catalyst 42 increases as the excess air ratio at the inlet to the catalyst 42 rises above 1.0, or in other words shifts to the lean side from the stoichiometric air-fuel ratio, and conversely, the excess air ratio difference before and after the catalyst 42 increases as the excess air ratio at the inlet to the catalyst 42 falls below 1.0, or in other words shifts to the rich side from the stoichiometric air-fuel ratio. It was also learned that when the catalyst 42 deteriorates, the difference in the excess air ratio before and after the catalyst is smaller than when the catalyst is new.

Therefore, using the characteristic shown in FIG. 3, deterioration of the catalyst 42 can be diagnosed in the region where the excess air ratio is greater than 1.0, or in other words further toward the lean side than the stoichiometric air-fuel ratio, and in the region where the excess air ratio is smaller than 1.0, or in other words further toward the rich side than the stoichiometric air-fuel ratio.

As yet, the reason why a difference in the excess air ratio before and after the catalyst 42 occurs in the region where the excess air ratio exceeds 1.0 has not been fully grasped, but the following reasons may be considered.

The principle harmful components that are discharged from the diesel engine 1 at low temperatures are HC and CO, but these components are converted into harmless $H_2O$ and $CO_2$ through oxidation using the catalyst. The water $H_2O$ adheres to a precious metal (platinum, for example) serving as the catalyst, and is thus ionized into hydrogen $H_2$ and an oxygen ion $O_2$—. It is believed that the downstream side wide range air-fuel ratio sensor 44 may detect the oxygen ion part as oxygen, leading to output indicating that the oxygen concentration is greater in the downstream side sensor 44 than the upstream side sensor 43. In other words, it is believed that a difference in the excess air ratio before and after the catalyst may occur in the region where the excess air ratio exceeds 1.0 due to this water $H_2O$.

To determine whether the catalyst characteristic shown in FIG. 3 is unique to the HC trap catalyst 42, a similar experiment was conducted on other catalysts (a NOx trap catalyst, a three-way catalyst, an oxidation catalyst, and so on). As a result, it was determined that a similar characteristic to the characteristic shown in FIG. 3 is obtained for any catalyst, regardless of type. Accordingly, catalyst deterioration can be diagnosed on the basis of the excess air ratio difference regardless of the type of engine and catalyst.

Figure 4:
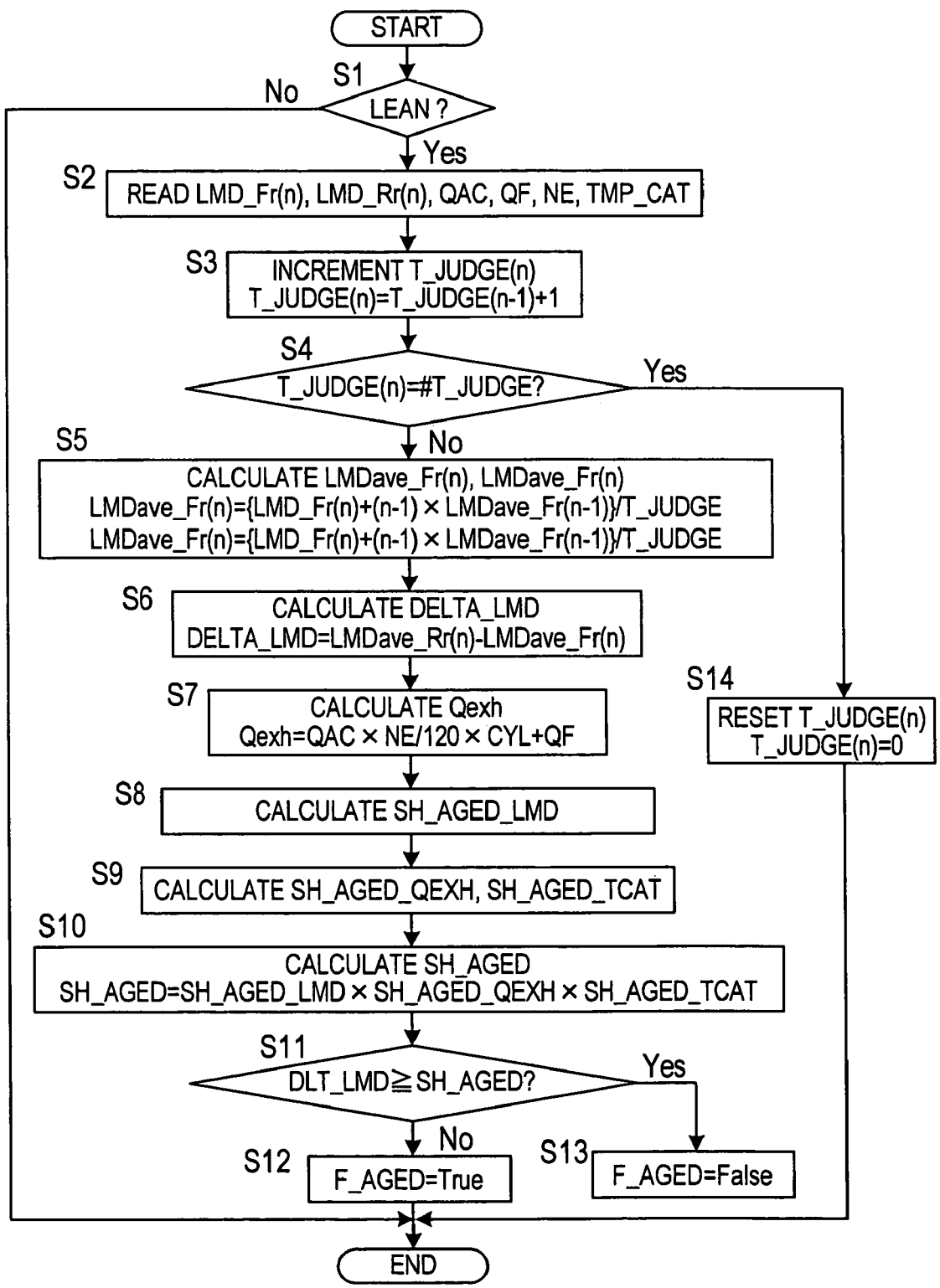
FIG. 4 is a flowchart of catalyst deterioration determination processing, performed by an engine controller.

The processing described above is executed by the engine controller 31. FIG. 4 shows this catalyst deterioration determination processing, which is performed by the engine controller 31 at fixed time intervals, for example every ten milliseconds.

In a step S1, a determination is made as to whether or not the engine 1 is operating at a lean air-fuel ratio. Since the engine 1 is a diesel engine, the engine 1 operates mainly at a lean air-fuel ratio, but during regeneration processing of the filter 41, the engine 1 operates at a rich air-fuel ratio or an air-fuel ratio in the vicinity of the stoichiometric air-fuel ratio. When the engine 1 is not operating at a lean air-fuel ratio, the current processing ends as is, and catalyst deterioration processing is not performed.

When the engine 1 is operating at a lean air-fuel ratio, the flow advances to a step S2. In the step S2, an excess air ratio LMD_Fr (n), LMD_Rr (n) before and after the catalyst 42, an intake air amount QAC detected by an air flow meter 35, a fuel injection amount QF calculated in another processing, an engine rotation speed NE detected by a sensor 33, and a temperature (to be referred to as a catalyst temperature hereafter) TMP_CAT of a catalyst carrier, detected by a sensor 45, are read.

The excess air ratio may be determined by dividing the air-fuel ratio detected by the wide range air-fuel ratio sensors 43, 44 by the stoichiometric air-fuel ratio of 14.7. The "n" that is added to LMD_Fr and LMD_Rr indicates a current value.

In a step S3, a counter value T_JUDGE (n) is incremented. The counter value T_JUDGE (n) denotes a counter set initially to zero at the initial execution timing of the flow in FIG. 4 or at the time of engine start-up, which is used to measure the sampling number of the excess air ratio before and after the catalyst 42.

In a step S4, the counter value T_JUDGE (n) is compared to a predetermined value #T_JUDGE. When the counter value T_JUDGE (n) does not match the predetermined value #T_JUDGE, the flow advances to a step S5.

In the step S5, an average excess air ratio LMDave_Fr at the inlet to the catalyst 42 and an average excess air ratio LMDave_Rr at the outlet of the catalyst 42 are calculated using the following equations (1), (2) respectively.

$$\text{LMDave\_Fr}(n) = \frac{\text{LMD\_Fr} + (n-1) \times \text{LMDave\_Fr}(n-1)}{\text{T\_JUDGE}(n)} \quad (1)$$

$$\text{LMDave\_Rr}(n) = \frac{\text{LMD\_Rr} + (n-1) \times \text{LMDave\_Rr}(n-1)}{\text{T\_JUDGE}(n)} \quad (2)$$

where

LMDave_Fr (n): current value of LMDave_Fr,
LMDave_Rr (n): current value of LMDave_Rr,
LMDave_Fr (n−1): preceding value of LMDave_Fr, and
LMDave_Rr (n−1): preceding value of LMDave_Rr.

In a step S6, a difference DELTA_LMD in the average excess air ratio at the inlet and outlet of the catalyst 42 is calculated using the following equation (3).

$$\text{DELTA\_LMD} = \text{LMDave\_Rr}(n) - \text{LMDave\_Fr}(n) \quad (3)$$

The value of DELTA_LMD, calculated in the equation (3), always takes a positive value under the conditions in which the flow in FIG. 4 is executed.

In a step S7, an exhaust gas flow Qexh flowing into the catalyst 42 is calculated using the following equation (4).

$$Qexh = QAC \times \frac{NE}{120} \times CYL + QF \quad (4)$$

where CYL: number of cylinders in the engine 1.

Figure 5:
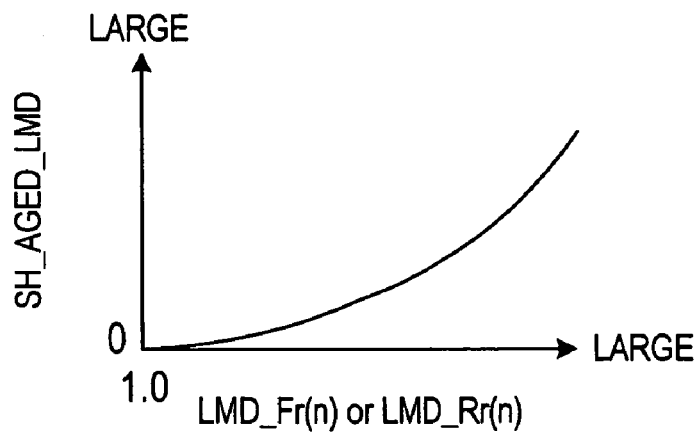
FIG. 5 is a characteristic diagram of a deterioration determination basic threshold.

In a step S8, a deterioration determination basic threshold SH_AGED_LMD, which corresponds to the excess air ratio difference before and after the catalyst 42 when the catalyst 42 has deteriorated, is calculated. The deterioration determination basic threshold SH_AGED_LMD is determined from LMDave_Rr (n), which is the current value of the average excess air ratio at the outlet of the catalyst 42, or from LMDave_Fr (n), which is the current value of the average excess air ratio at the inlet to the catalyst 42, by referring to a table shown in FIG. 5. As shown in FIG. 5, the deterioration determination basic threshold SH_AGED_LMD is a value which increases as the excess air ratio at the inlet or outlet of the catalyst 42 rises. This corresponds to the diagram in FIG. 3, in which the excess air ratio difference before and after the catalyst 42 increases as the excess air ratio at the inlet to the catalyst 42 rises.

In a step S9, an exhaust gas flow correction coefficient SH_AGED_QEXH and a temperature correction coefficient SH_AGED_TCAT of a deterioration determination threshold are calculated. The exhaust gas flow correction coefficient SH_AGED_QEXH is determined from the exhaust gas flow Qexh by referring to a table shown in FIG. 6, and the temperature correction coefficient SH_AGED_TCAT is determined from the catalyst temperature TMP_CAT by referring to a table shown in FIG. 7.

Figure 6:
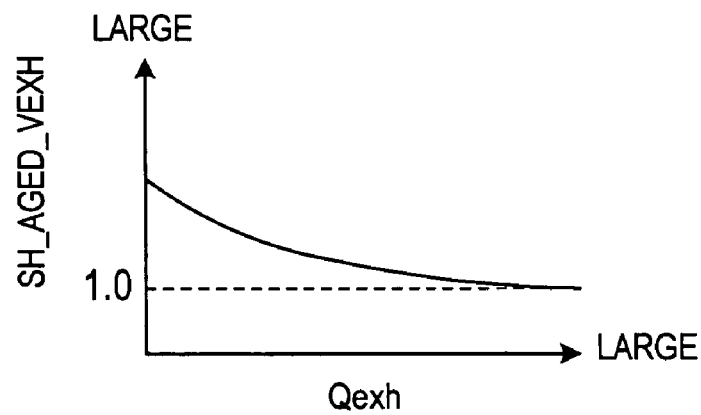
FIG. 6 is a characteristic diagram of an exhaust gas flow correction coefficient.

As shown in FIG. 6, the exhaust gas flow correction coefficient SH_AGED_QEXH is a value which increases beyond 1.0 as the exhaust gas flow Qexh decreases. This is due to the fact that the HC reduction rate of the catalyst 42 becomes larger when the exhaust gas flow is low than when the exhaust gas flow is high, and therefore if a deterioration determination basic threshold appropriate for a high exhaust gas flow is used when the exhaust gas flow is low, the deterioration determination threshold becomes too small, leading to a possible misdiagnosis of catalyst deterioration when the catalyst 42 has not yet deteriorated. To avoid this, the deterioration determination threshold is set to a large value.

Figure 7:
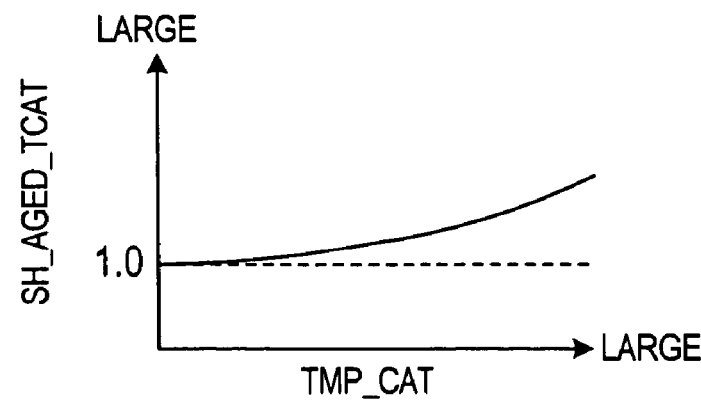
FIG. 7 is a characteristic diagram of a temperature correction coefficient.

As shown in FIG. 7, the temperature correction coefficient SH_AGED_TCAT is a value which increases beyond 1.0 as the catalyst temperature TMP_CAT rises. This is due to the fact that the HC reduction rate of the catalyst 42 becomes larger when the catalyst temperature is high than when the catalyst temperature is low, and therefore if a deterioration determination basic threshold appropriate for a low catalyst temperature is used when the catalyst temperature is high, the deterioration determination threshold becomes too small, leading to a possible misdiagnosis of catalyst deterioration when the catalyst 42 has not yet deteriorated. To avoid this, the deterioration determination threshold is set to a large value. The deterioration determination basic threshold SH_AGED_LMD is matched to a high exhaust gas flow and a low catalyst temperature in advance.

In a step S10, a deterioration determination threshold SH_AGED is calculated by multiplying the two correction coefficients SH_AGED_QEXH and SH_AGED_TCAT to the deterioration determination basic threshold SH_AGED_LMD, or in other words according to the following equation (5).

$$SH\_AGED = SH\_AGED\_LMD \times SH\_AGED\_QEXH \times SH\_AGED\_TCAT \quad (5)$$

It should be noted that in this embodiment, the deterioration determination threshold is calculated from three parameters, i.e. the excess air ratio at the inlet or outlet of the catalyst 42, the exhaust gas flow into the catalyst 42, and the temperature of the catalyst 42, but the deterioration determination threshold may be calculated on the basis of any one of these parameters.

In a step S11, the deterioration determination threshold SH_AGED is compared to the excess air ratio difference DELTA_LMD before and after the catalyst 42. If the excess air ratio difference DELTA_LMD is equal to or greater than the deterioration determination threshold SH_AGED, the catalyst 42 is determined not to have deteriorated, and the flow advances to a step S13, where a catalyst deterioration flag F_AGED is set to "False". In contrast, when the excess air ratio difference DELTA_LMD is less than the deterioration determination threshold SH_AGED, the catalyst 42 is determined to have deteriorated, and the flow advances to a step S12, where the catalyst deterioration flag F_AGED is set to "True". When the catalyst deterioration flag F_AGED is at "True", this indicates that the catalyst 42 has deteriorated, and when the catalyst deterioration flag F_AGED is at "False", this indicates that the catalyst 42 has not deteriorated.

Meanwhile, if the counter value T_JUDGE (n) matches the predetermined value #T_JUDGE in the step S4, the flow advances to a step S14, where the counter value T_JUDGE (n) is reset to zero. The current processing then ends. To calculate the average excess air ratio before and after the catalyst 42, the excess air ratio is divided by the sampling number, and hence the counter value T_JUDGE (n) is reset to zero every time the counter value T_JUDGE (n) matches the predetermined value #T_JUDGE to prevent the sampling number from becoming too large.

Next, the actions and effects of this embodiment will be described.

According to this embodiment, when the engine 1 operates at a lean air-fuel ratio, the average excess air ratio before and after the catalyst 42 is detected, and the catalyst 42 is determined to have deteriorated when the detected difference DELTA_LMD in the average excess air ratio before and after the catalyst 42 falls below the deterioration determination threshold SH_AGED (see the steps S11, S12 in FIG. 4). In so doing, a diagnosis as to whether or not the catalyst 42 has deteriorated can be performed even when the engine 1 is operating at a lean air-fuel ratio, thereby eliminating the need to return the air-fuel ratio to the stoichiometric air-fuel ratio in order to perform a deterioration diagnosis. As a result, the fuel economy does not deteriorate.

Moreover, the deterioration determination threshold SH_AGED is calculated according to the excess air ratio LMD_Fr (n), LMD_Rr (n) at the catalyst inlet or catalyst outlet, the exhaust gas flow Qexh flowing into the catalyst 42, and the catalyst temperature TMP_TCAT, which serve as the quantity of state of the catalyst 42 (see the steps S8-S10 in FIG. 4, and FIGS. 5-7), and therefore deterioration determination can be performed with a high degree of precision.

Figure 8:
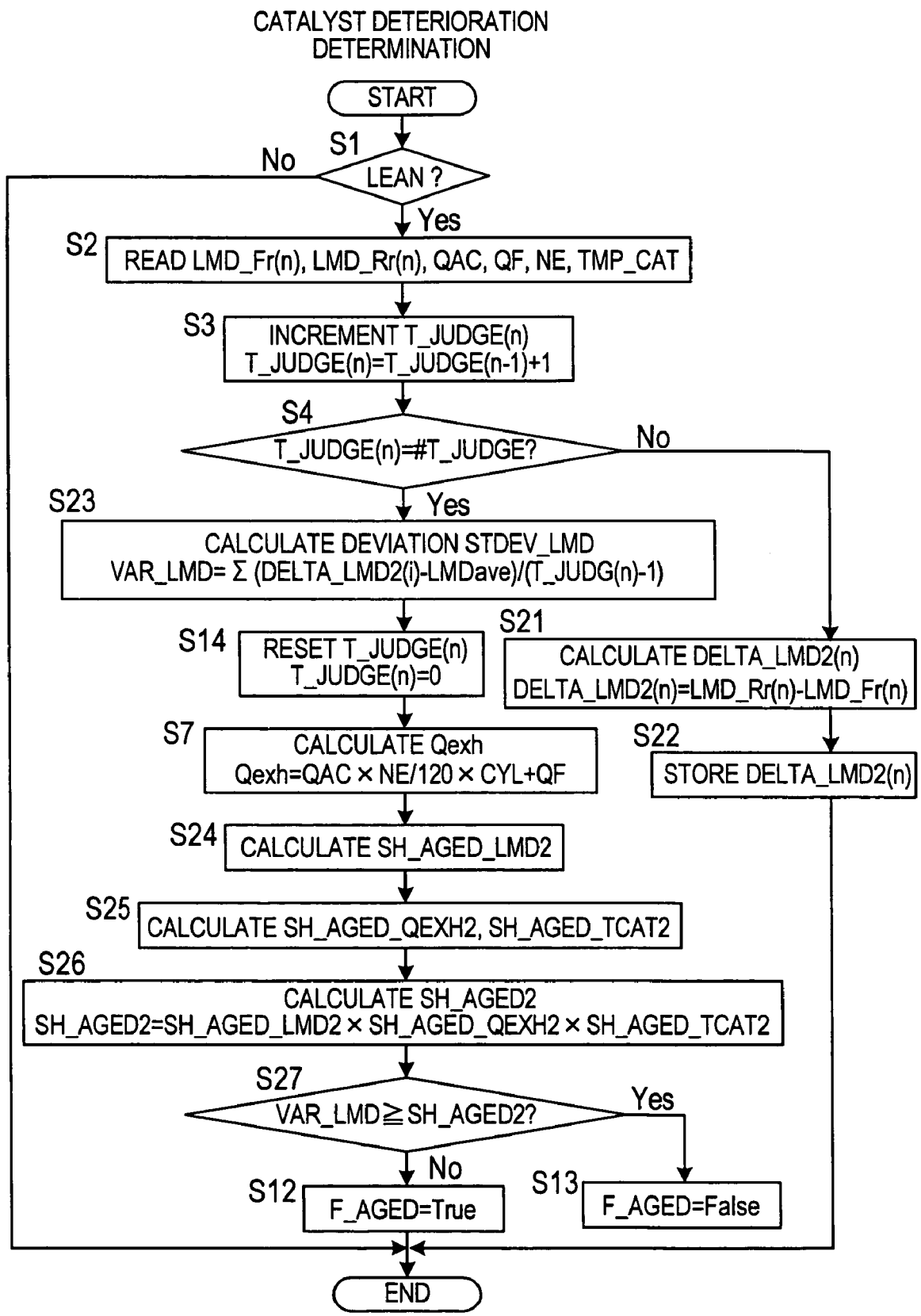
FIG. 8 is similar to FIG. 4, but shows a second embodiment of this invention.
Figure 12:
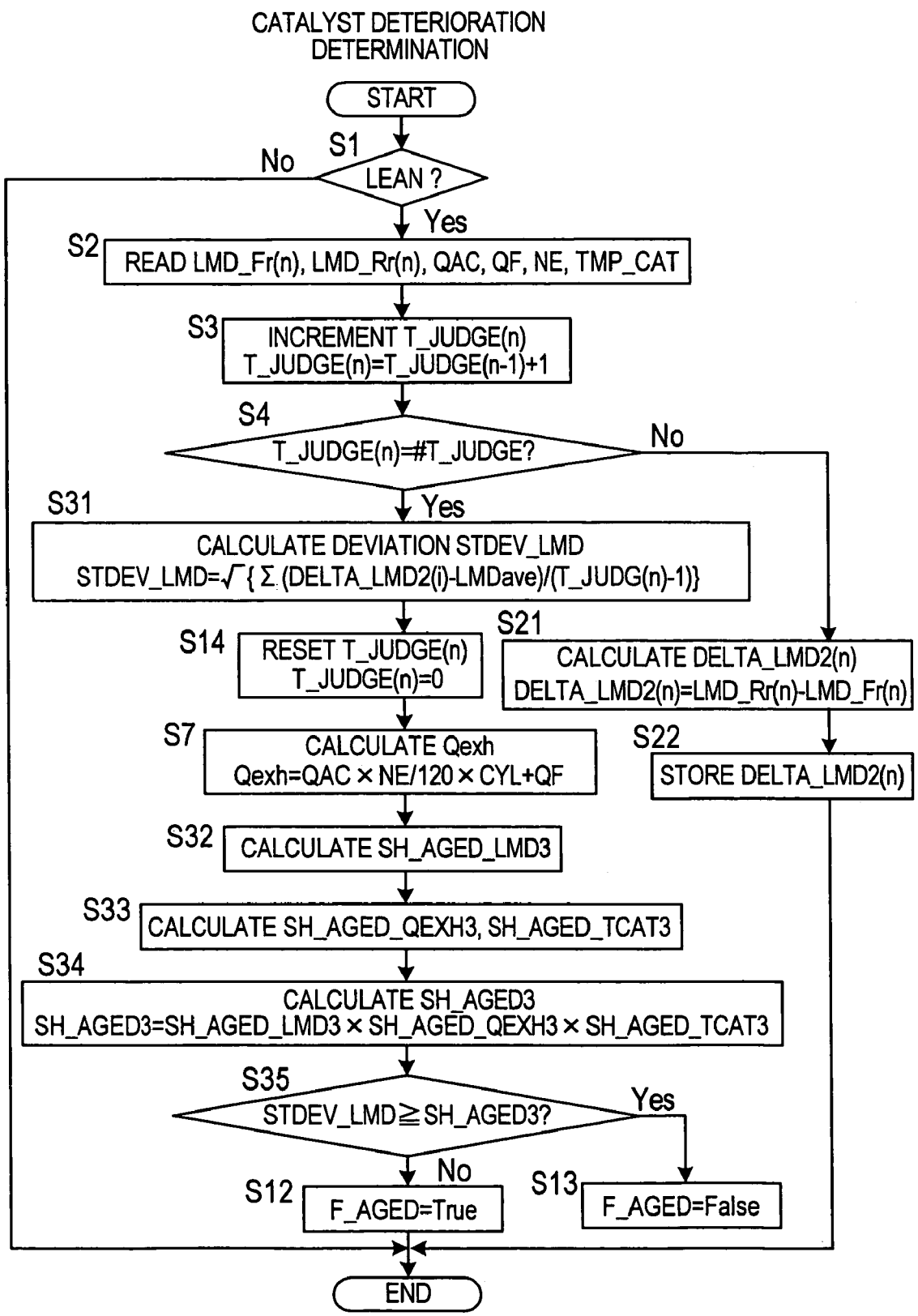
FIG. 12 is similar to FIG. 4, but shows a third embodiment of this invention.

FIGS. 8 and 12 show the flow of a second embodiment and a third embodiment respectively, and hence are substituted for FIG. 4 of the first embodiment. Identical parts to FIG. 4 have been allocated identical step numbers, and description thereof has been omitted for simplicity.

In the first embodiment, the determination as to whether or not the catalyst 42 has deteriorated is performed by comparing the excess air ratio difference DELTA_LMD before and after the catalyst 42 with the deterioration determination threshold SH_AGED, whereas in the second and third embodiments, the determination as to whether or not the catalyst 42 has deteriorated is performed by comparing a variance VAR_LMD in the excess air ratio difference before and after the catalyst 42 and a deviation STDEV_LMD in the excess air ratio difference before and after the catalyst 42 to corresponding deterioration determination thresholds SH_AGED2, SH_AGED3 respectively.

More specifically, in the second and third embodiments, when the counter value T_JUDGE (n) does not match the predetermined value #T_JUDGE in the step S4 in FIGS. 8, 12, the flow advances to a step S21, where an excess air ratio difference DELTA_LMD2 (n) before and after the catalyst 42 is calculated using the following equation (6).

$$DELTA\_LMD2(n) = LMD\_Rr(n) - LMD\_Fr(n) \quad (6)$$

In a step S22, the excess air ratio difference DELTA_LMD2 (n) is stored in memory, whereupon the current processing ends.

When the counter value T_JUDGE (n) matches the predetermined value #T_JUDGE after performing the processing of the steps S21, S22 repeatedly, in the second embodiment the flow advances from the step S4 in FIG. 8 to a step S23, where the variance VAR_LMD in the excess air ratio difference DELTA_LMD2 (n) before and after the catalyst 42 is calculated using the following equation (7). In the third embodiment, the flow advances from the step S4 in FIG. 12 to a step S31, where the deviation STDEV_LMD in the excess air ratio difference DELTA_LMD2 (n) before and after the catalyst 42 is calculated using the following equation (8).

$$VAR\_LMD = \frac{\sum (DELTA\_LMD2(i) - LMDave)}{T\_JUDGE(n) - 1} \quad (7)$$

$$STDEV\_LMD = \frac{\sqrt{DELTA\_LMD2(i) - LMDave}}{T\_JUDGE(n) - 1} \quad (8)$$

where LMDave: average value of DELTA_LMD2 (n) over a predetermined time period.

Steps S24-S26 in FIG. 8 of the second embodiment and steps S32-S34 in FIG. 12 of the third embodiment are identical to the steps S8-S10 in FIG. 4 of the first embodiment.

In the second embodiment, a deterioration determination basic threshold SH_AGED_LMD2, corresponding to the variance in the excess air ratio difference before and after the catalyst 42 when the catalyst 42 has deteriorated, is calculated in the step S24 of FIG. 8. The deterioration determination basic threshold SH_AGED_LMD2 is determined from the average excess air ratio LMDave_Rr (n) at the outlet of the catalyst 42 or the average excess air ratio LMDave_Fr (n) at the inlet to the catalyst 42 by referring to a table shown in FIG. 9.

In the third embodiment, a deterioration determination basic threshold SH_AGED_LMD3, corresponding to the deviation in the excess air ratio difference before and after the catalyst 42 when the catalyst 42 has deteriorated, is calculated in the step S32 of FIG. 12. The deterioration determination basic threshold SH_AGED_LMD3 is determined from the average excess air ratio LMDave_Rr (n) at the outlet of the catalyst 42 or the average excess air ratio LMDave_Fr (n) at the inlet to the catalyst 42 by referring to a table shown in FIG. 13.

Figure 9:
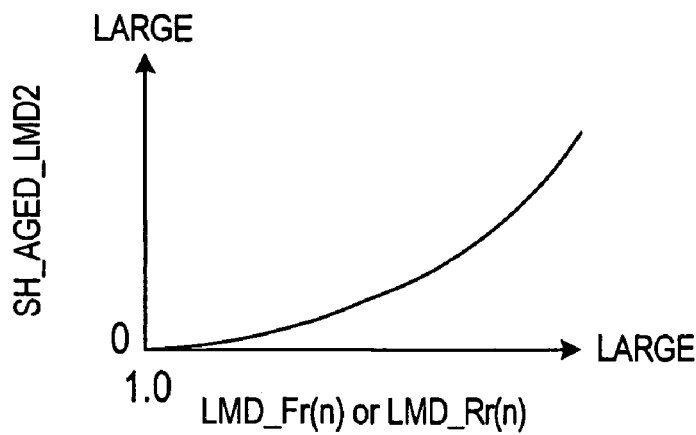
FIG. 9 is a characteristic diagram of a deterioration determination basic threshold.
Figure 13:
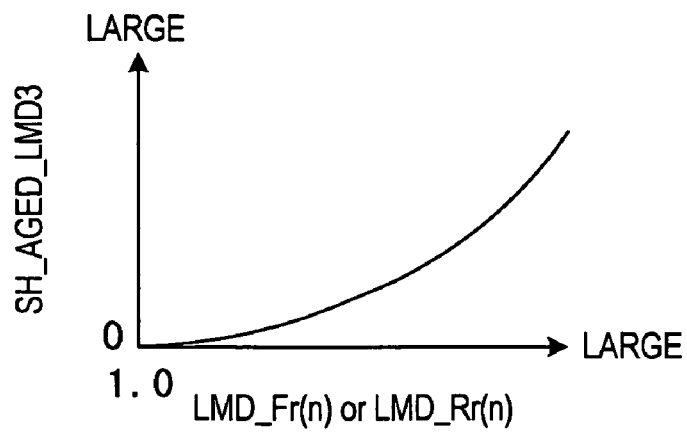
FIG. 13 is a characteristic diagram of a deterioration determination basic threshold.

As shown in FIGS. 9, 13, the value of the deterioration determination basic thresholds SH_AGED_LMD2, SH_AGED_LMD3 increases as the excess air ratio rises. This corresponds to the fact that the excess air ratio difference before and after the catalyst 42 increases as the excess air ratio rises.

In the second embodiment, an exhaust gas flow correction coefficient SH_AGED_QEXH2 and a temperature correction coefficient SH_AGED_TCAT2 of the deterioration determination basic threshold SH_AGED_LMD2 are calculated in the step S25 of FIG. 8. The deterioration determination threshold SH_AGED2 is then calculated by multiplying the two correction coefficients SH_AGED_QEXH2 and SH_AGED TCAT2 to the deterioration determination basic threshold SH_AGED_LMD2 in the step S26 of FIG. 8, or in other words according to the following equation (9).

$$SH\_AGED2 = SH\_AGED\_LMD2 \times SH\_AGED\_QEXH2 \times SH\_AGED\_TCAT2 \quad (9)$$

In the third embodiment, an exhaust gas flow correction coefficient SH_AGED QEXH3 and a temperature correction coefficient SH_AGED_TCAT3 of the deterioration determination basic threshold SH_AGED LMD3 are calculated in the step S33 of FIG. 12. The deterioration determination threshold SH_AGED3 is then calculated by multiplying the two correction coefficients SH_AGED_QEXH3 and SH_AGED_TCAT3 to the deterioration determination basic threshold SH_AGED_LMD3 in the step S34 of FIG. 12, or in other words according to the following equation (10).

$$SH\_AGED3 = SH\_AGED\_LMD3 \times SH\_AGED\_QEXH3 \times SH\_AGED\_TCAT3 \quad (10)$$

Next, in the second embodiment, the deterioration determination threshold SH_AGED2 is compared to the variance VAR_LMD in the excess air ratio difference before and after the catalyst 42 in a step S27 of FIG. 8. If the variance VAR_LMD in the excess air ratio difference before and after the catalyst 42 is equal to or greater than the deterioration determination threshold SH_AGED2, it is determined that the catalyst 42 has not yet deteriorated, and the flow advances to the step S13 in FIG. 8, where the catalyst deterioration flag F_AGED is set to "False". In contrast, when the variance VAR_LMD in the excess air ratio difference is less than the deterioration determination threshold SH_AGED2, the catalyst 42 is determined to have deteriorated, and the flow advances to the step S12 of FIG. 8, where the catalyst deterioration flag F_AGED is set to "True".

In the third embodiment, the deterioration determination threshold SH_AGED3 is compared to the deviation STDEV_LMD in the excess air ratio difference before and after the catalyst 42 in a step S35 of FIG. 12. If the deviation STDEV_LMD in the excess air ratio difference before and after the catalyst 42 is equal to or greater than the deterioration determination threshold SH_AGED3, it is determined that the catalyst 42 has not yet deteriorated, and the flow advances to the step S13 in FIG. 12, where the catalyst deterioration flag F_AGED is set to "False". In contrast, when the deviation STDEV_LMD in the excess air ratio difference is less than the deterioration determination threshold SH_AGED3, the catalyst 42 is determined to have deteriorated, and the flow advances to the step S12 of FIG. 12, where the catalyst deterioration flag F_AGED is set to "True".

Figure 10:
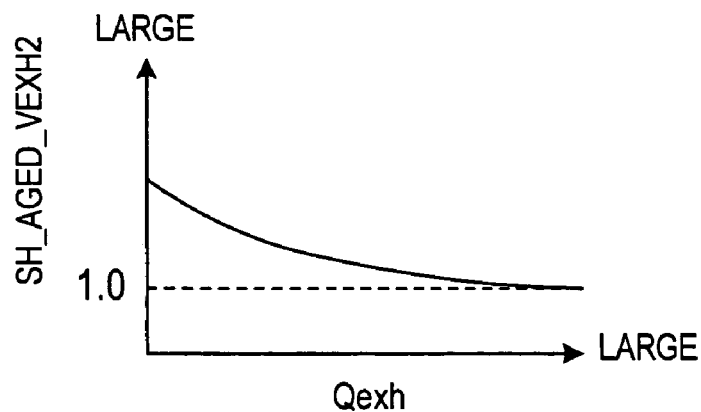
FIG. 10 is a characteristic diagram of an exhaust gas flow correction coefficient.
Figure 11:
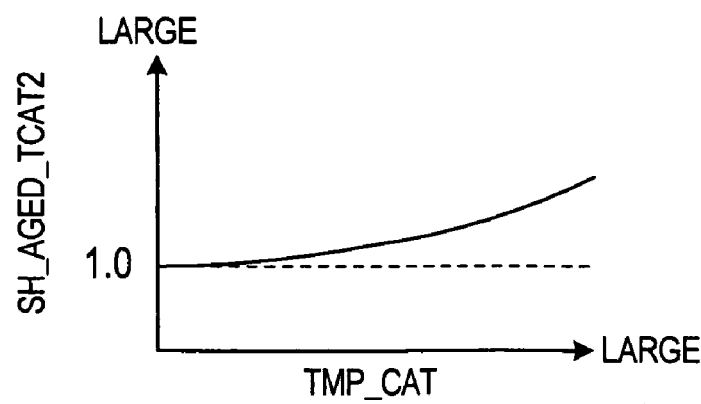
FIG. 11 is a characteristic diagram of a temperature correction coefficient.

In the second embodiment, the exhaust gas flow correction coefficient SH_AGED_QEXH2 is determined from the exhaust gas flow Qexh by referring to a table shown in FIG. 10, and the temperature correction coefficient SH_AGED_TCAT2 is determined from the catalyst temperature TMP_CAT by referring to a table shown in FIG. 11.

Figure 14:
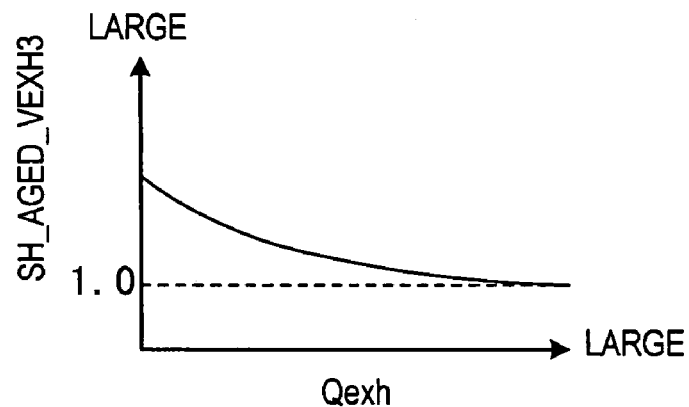
FIG. 14 is a characteristic diagram of an exhaust gas flow correction coefficient.
Figure 15:
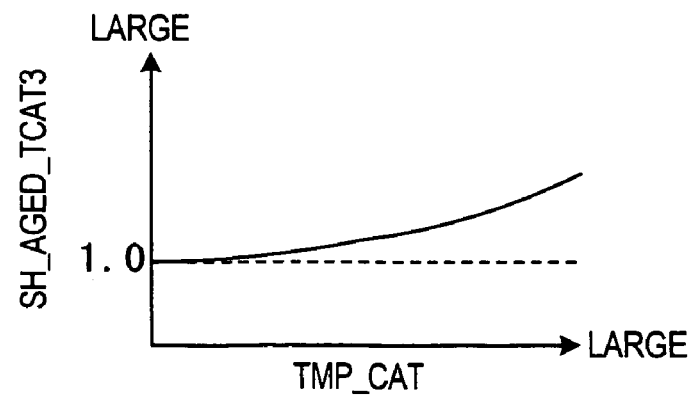
FIG. 15 is a characteristic diagram of a temperature correction coefficient.

In the third embodiment, the exhaust gas flow correction coefficient SH_AGED_QEXH3 is determined from the exhaust gas flow Qexh by referring to a table shown in FIG. 14, and the temperature correction coefficient SH_AGED_TCAT3 is determined from the catalyst temperature TMP_CAT by referring to a table shown in FIG. 15.

In the second and third embodiments, as shown in FIGS. 10, 14, the reason for setting the exhaust gas flow correction coefficients SH_AGED_QEXH2, SH_AGED_QEXH3 to values which increase beyond 1.0 as the exhaust gas flow Qexh decreases is identical to the reason for setting the exhaust gas flow correction coefficient SH_AGED_QEXH in the first embodiment to a value which increases beyond 1.0 as the exhaust gas flow Qexh decreases.

In the second and third embodiments, as shown in FIGS. 11, 15, the reason for setting the temperature correction coefficients SH_AGED_TCAT2, SH_AGED_TCAT3 to values which increase beyond 1.0 as the catalyst temperature TMP_CAT rises is identical to the reason for setting the temperature correction coefficient SH_AGED_TCAT in the first embodiment to a value which increases beyond 1.0 as the catalyst temperature TMP_CAT rises.

By means of the control described above, the same actions and effects to those of the first embodiment are exhibited in the second and third embodiments.

In the first through third embodiments described above, the sensors 43, 44 are wide range air-fuel ratio sensors, but the sensors 43, 44 may be oxygen sensors having an output which varies binarily about the stoichiometric air-fuel ratio. As long as the output of the oxygen sensors varies even slightly in relation to the air-fuel ratio in the lean air-fuel ratio region, excluding the vicinity of the stoichiometric air-fuel ratio, then the oxygen sensors may be used in a similar fashion to the wide range air-fuel ratio sensors.

Furthermore, in the embodiments described above, a case was described in which the excess air ratio is used, but the air-fuel ratio may be used instead of the excess air ratio.

Also in the embodiments described above, a case was described in which the engine 1 is a diesel engine, but the engine 1 may be a gasoline engine.

The entire contents of Japanese Patent Application P2004-053376 (filed Feb. 27, 2004) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

The invention claimed is:

1. A catalyst deterioration diagnosing device comprising:
   an exhaust gas purification catalyst provided in an exhaust passage of an engine;
   an upstream side sensor which detects a characteristic of an exhaust gas on an upstream side of the catalyst;
   a downstream side sensor which detects a characteristic of the exhaust gas on a downstream side of the catalyst; and
   a controller into which a detection signal of the sensors is input, functioning to:
   calculate a value expressing a difference in an oxygen concentration on the upstream side and the downstream side of the catalyst from the two detected values only when the engine operates at a lean air-fuel ratio; and
   determine that the catalyst has deteriorated when the value expressing the difference in the oxygen concentration is smaller than a deterioration determination threshold, the deterioration determination threshold being set larger as the air-fuel ratio at an inlet or an outlet of the catalyst becomes leaner,
   wherein both the upstream side sensor and the downstream side sensor are wide range air-fuel ratio sensors which detect the air-fuel ratio in a linear fashion.

2. The device as defined in claim 1, wherein the value expressing the difference in the oxygen concentration is a difference in an average excess air ratio upstream and downstream of the catalyst over a predetermined time period.

3. The device as defined in claim 1, wherein the value expressing the difference in the oxygen concentration is a difference in an average air-fuel ratio upstream and downstream of the catalyst over a predetermined time period.

4. The device as defined in claim 1, wherein the value expressing the difference in the oxygen concentration is a variance in an excess air ratio difference upstream and downstream of the catalyst over a predetermined time period.

5. The device as defined in claim 1, wherein the value expressing the difference in the oxygen concentration is a variance in the air-fuel ratio difference upstream and downstream of the catalyst over a predetermined time period.

6. The device as defined in claim 1, wherein the value expressing the difference in the oxygen concentration is a deviation in an excess air ratio difference upstream and downstream of the catalyst over a predetermined time period.

7. The device as defined in claim 1, wherein the value expressing the difference in the oxygen concentration is a deviation in the air-fuel ratio difference upstream and downstream of the catalyst over a predetermined time period.

8. A method of diagnosing deterioration of an exhaust gas purification catalyst provided in an exhaust passage of an engine, comprising:
  detecting a characteristic of an exhaust gas on an upstream side of the catalyst using a wide range air-fuel ratio sensor which detects the air-fuel ratio in a linear fashion;
  detecting a characteristic of the exhaust gas on a downstream side of the catalyst using a wide range air-fuel ratio sensor which detects the air-fuel ratio in a linear fashion;
  calculating a value expressing a difference in an oxygen concentration on the upstream side and the downstream side of the catalyst from the two detected values only when the engine operates at a lean air-fuel ratio; and
  determining that the catalyst has deteriorated when the value expressing the difference in the oxygen concentration is smaller than a deterioration determination threshold, the deterioration determination threshold being set larger as the air-fuel ratio at an inlet or an outlet of the catalyst becomes leaner.

9. A catalyst deterioration diagnosing device comprising:
  an exhaust gas purification catalyst provided in an exhaust passage of an engine;
  means for detecting a characteristic of an exhaust gas on an upstream side of the catalyst comprising a wide range air-fuel ratio sensor which detects the air-fuel ratio in a linear fashion;
  means for detecting a characteristic of the exhaust gas on a downstream side of the catalyst comprising a wide range air-fuel ratio sensor which detects the air-fuel ratio in a linear fashion;
  means for calculating a value expressing a difference in an oxygen concentration on the upstream side and the downstream side of the catalyst from the two detected values only when the engine operates at a lean air-fuel ratio; and
  means for determining that the catalyst has deteriorated when the value expressing the difference in the oxygen concentration is smaller than a deterioration determination thresholds, the deterioration determination threshold being set larger as the air-fuel ratio at an inlet or an outlet of the catalyst becomes leaner.

* * * * *